United States Patent
Carrington

(10) Patent No.: US 11,069,132 B2
(45) Date of Patent: *Jul. 20, 2021

(54) SYSTEM FOR GENERATING VIRTUAL BUILDING PLAN DATA BASED UPON STORED AND SCANNED BUILDING DATA AND RELATED METHODS

(71) Applicant: Charles C. Carrington, Cocoa, FL (US)

(72) Inventor: Charles C. Carrington, Cocoa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/511,656

(22) Filed: Jul. 15, 2019

(65) Prior Publication Data

US 2020/0151950 A1    May 14, 2020

Related U.S. Application Data

(63) Continuation of application No. 15/340,399, filed on Nov. 1, 2016, now Pat. No. 10,354,439.

(Continued)

(51) Int. Cl.
*G06T 17/05* (2011.01)
*G06T 19/20* (2011.01)
(Continued)

(52) U.S. Cl.
CPC .............. *G06T 17/05* (2013.01); *G06F 3/011* (2013.01); *G06F 3/012* (2013.01); *G06K 9/00637* (2013.01); *G06T 19/20* (2013.01); *H04W 4/026* (2013.01); *H04W 4/33* (2018.02); *H04W 4/90* (2018.02); *G06T 19/006* (2013.01); *G06T 2200/04* (2013.01); *G06T 2200/08* (2013.01);
(Continued)

(58) Field of Classification Search
None
See application file for complete search history.

(56) References Cited

U.S. PATENT DOCUMENTS 5,815,411 A   9/1998  Ellenby et al.
5,991,827 A   11/1999 Ellenby et al.
(Continued)

OTHER PUBLICATIONS

Ryan Bane, Tobias Hollerer, Unviersity of California, Santa Barbara; Interactive Tools for Virtual X-Ray Vision in Mobile Augmented Reality; Proceedings of the Third IEEE and ACM International Symposium on Mixed and Augmented Reality (ISMAR 2004); 2004; pp. 1-9.

(Continued)

*Primary Examiner* — Tize Ma
(74) *Attorney, Agent, or Firm* — K&L Gates LLP

(57) ABSTRACT

A system may include a building scanning device configured to scan a target building and generate scanned building data based thereon. The system may also include a processor and a communication interface coupled thereto. The processor may be configured to cooperate with the communication interface to obtain stored building data for the target building from a remote stored data source and cooperate with the building scanning device to obtain the scanned building data. The processor may also be configured to generate virtual building plan data based upon the stored building data and the scanned building data and drive at least one display based upon the virtual building plan data.

27 Claims, 6 Drawing Sheets

Related U.S. Application Data

(60) Provisional application No. 62/412,023, filed on Oct. 24, 2016.

(51) Int. Cl.
*G06K 9/00* (2006.01)
*G06F 3/01* (2006.01)
*H04W 4/33* (2018.01)
*H04W 4/02* (2018.01)
*H04W 4/90* (2018.01)
*G06T 19/00* (2011.01)

(52) U.S. Cl.
CPC ...... *G06T 2200/24* (2013.01); *G06T 2210/04* (2013.01); *G06T 2219/004* (2013.01)

(56) References Cited

U.S. PATENT DOCUMENTS

| | | | |
|---|---|---|---|
| 6,031,545 | A | 2/2000 | Ellenby et al. |
| 6,064,398 | A | 5/2000 | Ellenby et al. |
| 6,098,118 | A | 8/2000 | Ellenby et al. |
| 6,278,461 | B1 | 8/2001 | Ellenby et al. |
| 6,307,556 | B1 | 10/2001 | Ellenby et al. |
| 6,522,292 | B1 | 2/2003 | Ellenby et al. |
| 6,535,210 | B1 | 3/2003 | Ellenby et al. |
| 6,690,370 | B2 | 2/2004 | Ellenby et al. |
| 6,804,726 | B1 | 10/2004 | Ellenby et al. |
| 7,301,536 | B2 | 11/2007 | Ellenby et al. |
| 7,389,207 | B2 | 6/2008 | Saitta |
| 7,916,138 | B2 | 3/2011 | Ellenby et al. |
| 8,228,413 | B2 | 7/2012 | Ellenby et al. |
| 8,271,431 | B1 | 9/2012 | Carrington |
| 8,606,747 | B2 | 12/2013 | Carrington |
| 9,275,357 | B2 | 3/2016 | Carrington |
| 9,304,003 | B1 | 4/2016 | Ashman et al. |
| 10,354,439 | B2 * | 7/2019 | Carrington ............ G06F 3/011 |
| 2002/0196202 | A1 | 12/2002 | Bastian et al. |
| 2005/0288957 | A1 | 12/2005 | Eraker et al. |
| 2008/0158256 | A1 | 7/2008 | Russell et al. |
| 2008/0218331 | A1 | 9/2008 | Baillot |
| 2009/0077214 | A1 | 3/2009 | Buster et al. |
| 2010/0103196 | A1 | 4/2010 | Kumar et al. |
| 2010/0142748 | A1 | 6/2010 | Oldroyd |
| 2010/0238161 | A1 | 9/2010 | Varga et al. |
| 2010/0240988 | A1 | 9/2010 | Varga et al. |
| 2013/0155058 | A1 | 6/2013 | Golparvar-Fard et al. |
| 2013/0162632 | A1 | 6/2013 | Varga et al. |
| 2013/0176192 | A1 | 7/2013 | Varga et al. |
| 2014/0240313 | A1 | 8/2014 | Varga |
| 2015/0054826 | A1 | 2/2015 | Varga |
| 2015/0227644 | A1 | 8/2015 | Schultz |
| 2016/0026253 | A1 | 1/2016 | Bradski et al. |
| 2016/0078278 | A1 | 3/2016 | Moore et al. |

OTHER PUBLICATIONS

Carlos A. Vanegas et al, "Automatic Extraction of Manhattan-World Building Masses from 3D Laser Range Scans", IEEE Transactions on Visualization and Computer Graphics, vol. 18, No. 10, Oct. 2012, pp. 1627-1637.

Zeibak-Shini R, Sacks R, Filin S. "Toward generation of a Building Information Model of a deformed structure using laser scanning technology", In 14th International Conference on Computing in Civil and Building Engineering (ICCCBE) 2012 (pp. 138-156).

Matthew Johnston, Avideh Zakhor, "Estimating building floor plans from exterior using laser scanners", Proc. SPIE 6805, Three Dimensional Image Capture and Applications 2008, 68050H (Feb. 26, 2008); http://www-video.eecs.berkeley.edu/papers/mjohnston/spie-2008.pdf.

Carrington, Charles C., U.S. Appl. No. 15/006,856, filed Jan. 26, 2016.

\* cited by examiner

SYSTEM FOR GENERATING VIRTUAL BUILDING PLAN DATA BASED UPON STORED AND SCANNED BUILDING DATA AND RELATED METHODS

CROSS-REFERENCE TO RELATED APPLICATIONS

The present application is a continuation of U.S. application Ser. No. 15/340,399, filed Nov. 1, 2016, which claims the priority benefit of U.S. Provisional Application Ser. No. 62/412,023 filed on Oct. 24, 2016, the entire contents of which are herein incorporated in its entirety by reference.

TECHNICAL FIELD

The present application is directed to the field of mapping, and more particularly, to the generation of virtual building plan data and related methods.

BACKGROUND

Tactical operators and emergency responders rely relatively heavily on maps not only for planning operations, but for their own situational awareness and to coordinate their actions with others. For tactical operators and emergency responders, maps may be particularly important when operating in structural terrain. Structural terrain, for example, may not only include buildings—residential, commercial, civic, etc., but may also include sewer systems, subways, parking garages, bridges, dams, power plants and substations, and other manmade structures within which people can move and act, and within which operators and emergency responders operate.

Operation in this structural terrain may be particularly challenging as standard geographic maps, for example, may provide relatively basic geographic information, such as, roadways and monuments. However, standard geographical maps may be inadequate in urban settings with increased amounts of structural terrain. Additionally, the useful and up-to-date maps may be unavailable for certain structures. Moreover, since a relatively large amount of people are concentrated in areas of increased structural terrain, these areas of structural terrain are typically where emergency services are most desired.

Several systems address the shortcomings of standard geographic maps by augmenting reality with certain situational data. U.S. Pat. No. 5,815,411 to Ellenby et al. is directed to an electro-optic vision system which exploits position and attitude. More particularly, Ellenby et al. discloses an augmented reality system that includes a 1) camera to collect optical information about a real scene and present that information as an electronic signal to; a 2) computer processor; a 3) device to measure the position of the camera; and a 4) device to measure the attitude of the camera (direction of the optical axis), thus uniquely identifying the scene being viewed, and thus identifying a location in; a 5) data base where information associated with various scenes is stored, the computer processor combines the data from the camera and the data base and perfects a single image to be presented at; a 6) display whose image is continuously aligned to the real scene as it is viewed by the user.

U.S. Patent Application No. 2002/0196202 to Bastian et al. is directed to a method for displaying emergency first responder command, control, and safety information using augmented reality. More particularly, Bastian et al. discloses displaying a layout of incident space on a display in the form of a geometric model. The geometric model may be a 3D model, for example, constructed using stereoscopic images or entered into a computer a priori.

SUMMARY

A system may include a building scanning device configured to scan a target building and generate scanned building data based thereon. The system may also include a processor and a communication interface coupled thereto. The processor may be configured to cooperate with the communication interface to obtain stored building data for the target building from a remote stored data source and cooperate with the building scanning device to obtain the scanned building data. The processor may also be configured to generate virtual building plan data based upon the stored building data and the scanned building data and drive at least one display based upon the virtual building plan data. Accordingly, the system may generate virtual building plan data, for example, which may be more current and accurate relative to standard geographic maps.

The processor may be configured to generate the virtual building plan data for three-dimensions, for example. The building scanning device may be configured to scan a target building from an exterior thereof.

The virtual building plan data may include wall data. The processor may be configured to drive the at least one display to display an x-ray view through walls in the target building, for example.

The building scanning device may include an unmanned aerial vehicle. The building scanning device may include a laser scanning device, for example.

The system may further include a portable housing to be carried by a user and configured to carry the processor and the user interface. The system may also include a user-wearable helmet to be carried by a user and configured to carry the processor and the user interface, for example.

The system may also include a user interface device configured to be carried by a user. The user interface device may include a portable housing configured to carry the at least one display, and a user device controller carried by the portable housing. The user device controller is configured to obtain the virtual building plan data from the processor and display the virtual building plan data on the at least one display, for example. The user interface device may include a user-wearable helmet configured to carry the at least one display and the user device controller, for example.

The user interface device may include a user-wearable helmet mounting the portable housing.

The user interface device may include an orientation sensor carried by the portable housing. The user device controller may be configured to display the virtual building plan data based upon the orientation sensor, for example.

The stored building data may include at least one of permitting data, property appraisal data, and property taxation data, for example. The processor may be configured to cooperate with the communication interface to obtain the stored building data for the target building from a remote stored data source that includes at least one governmental data source, for example.

A method aspect is directed to a method of generating virtual building plan data and may include using a processor coupled to a communication interface to cooperate with the communication interface to obtain stored building data for a target building from a remote stored data source and cooperate with a building scanning device to obtain the scanned building data. The building scanning device may be configured to scan the target building and generate the scanned building data based thereon. The method may also include using the processor to generate the virtual building plan data based upon the stored building data and the scanned building data and drive at least one display based upon the virtual building plan data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
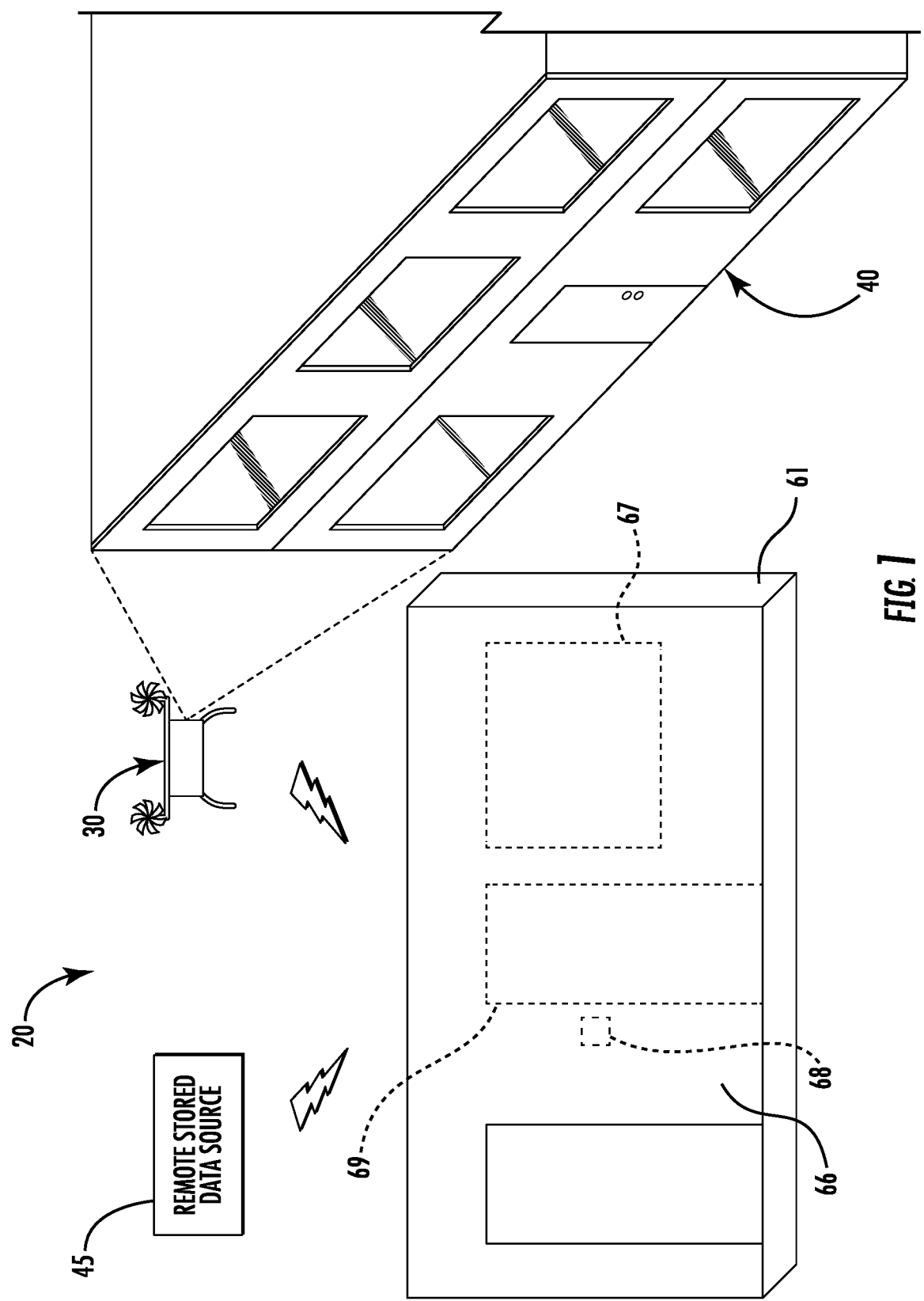
FIG. 1 is a diagram of a system for generating virtual building plan data in accordance with an embodiment.
Figure 2:
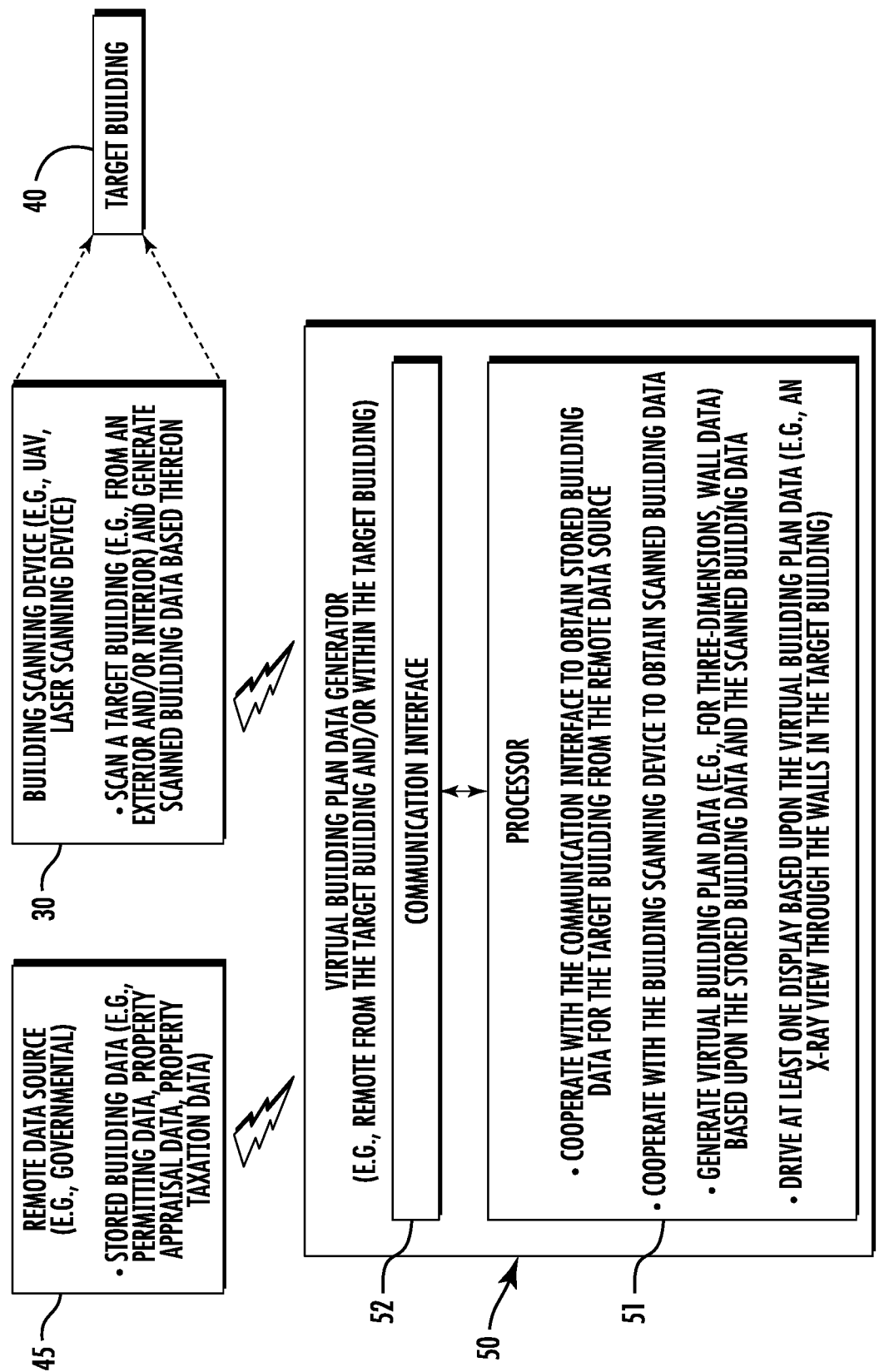
FIG. 2 is a schematic block diagram of the system of FIG. 1.

Referring initially to FIGS. 1-2 a system 20 may include a building scanning device 30. The building scanning device 30 is configured to scan a target building 40, for example, in three dimensions, and generate scanned building data based upon the scan of the target building. In one embodiment, the building scanning device 30 may be an unmanned aerial vehicle (UAV), for example. In another embodiment, the building scanning device 30 may be a laser scanning device. Of course, the building scanning device 30 may be both a UAV and a laser scanning device, there may be more than one building scanning device, and different types of building scanning devices may be used. The building scanning device 30 may also be both a UAV and incorporate laser scanning, as will be appreciated by those skilled in the art.

In operation, the building scanning device 30 may be used to scan an exterior of the target building 40 to generate the scanned building data. In some embodiments, the building scanning device 30 also scans an interior of the target building 40 or both the interior and exterior of the target building.

A virtual building plan data generator 50 includes a processor 51 and a communication interface 52 coupled to the processor. The communication interface 52 may be in the form of a hardware or software interface. For example, in some embodiments, the virtual building plan data generator 50 may also include wireless communications circuitry, for example, WiFi and/or cellular, cooperating with the processor 51 to permit communication therewith. In other embodiments, the communication interface 52 may alternatively or additionally permit communication via one or more software ports over a network, such as, for example, the Internet. The communication interface 52 may include other and/or additional hardware and/or software components to permit communication with the virtual building plan generator 50 from, for example, remote devices.

The processor 51 cooperates with the communication interface 52 to obtain stored building data for the target building 40 from a remote stored data source 45. The remote stored data source 45 may be a single database that includes building data stored from multiple data sources, for example, aggregated. The remote stored data source 45 may be associated with a governmental agency, for example a permitting agency, a property appraisal agency, and/or a tax collector, such that the stored building data may include permitting data, property appraisal data, and/or property taxation data. The stored building data from these types of sources or including this type of data may be particularly advantageous as it may include details about the interior layouts of the target building 40. For example, the stored building data may include an indication of how large the target building 40 may be, the location of doors, emergency escape routes, alarm pulls, fire suppression devices, etc. The processor 51 may obtain stored building data for the target building 40 from more than one remote stored data source, which may be, for example, associated with different or multiple governmental data sources.

The processor 51 cooperates with the building scanning device 30 to obtain the scanned building data. The processor 51 may obtain the scanned building data wirelessly, for example, via the Internet, WiFi, Bluetooth, and/or other wireless protocol. The processor 51 may also obtain the scanned building data from the building scanning device 30 via a wired connection or other data transfer technique, for example, a memory card.

The processor 51 generates virtual building plan data based upon the stored building data and the scanned building data. The processor 51 may generate the virtual building plan data for three dimensions, for example. The virtual building plan data generated may include wall data, floor plan data, ceiling data, electrical system data, plumbing data, alarm system data, fire suppression system data, entry/exit data, building material data, etc., as will be appreciated by those skilled in the art. In other words, the stored building data and scanned building data may be considered to be combined, compared, aligned, mapped, manipulated, and transformed (e.g., into three-dimensions) to generate virtual building plan data.

The processor 51 drives a display 61 based upon the virtual building plan data. The processor 51 may drive multiple displays, for example, simultaneously. More particularly, in some embodiments, the processor 51 may be configured to drive the display 61 to display an x-ray view through walls 66 in the target building 40. By driving the display 61 to display an x-ray view of through walls 66, for example, a rescuer may be more quickly able to determine, for example, a location of a victim, an entry/exit (e.g., door 69, window 67), alarm pull 68, and/or a utility shutoff in an adjacent room relative to the current room or current room view. The display 61 may be toggled between two-dimensions and three-dimensions, as will be described in further detail below.

The virtual building plan data generator 50 may be a remote from the target building 40, for example, in the cloud. Alternatively, the virtual building plan data generator 50 may be carried by a user within an interior of the target building 40 or at a command and control center adjacent the target building.

Figure 3:
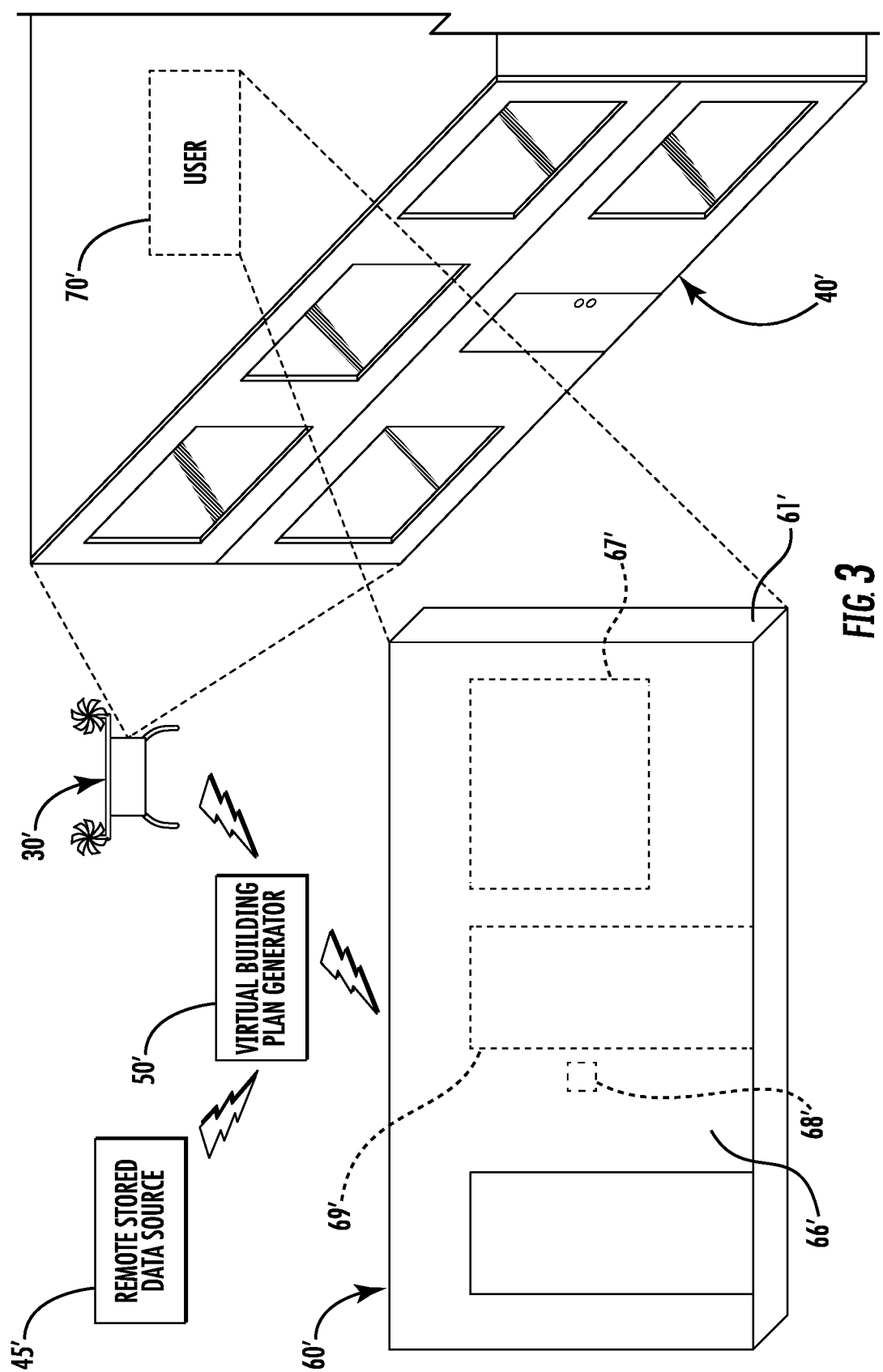
FIG. 3 is a diagram of a system for generating virtual building plan data in accordance with another embodiment.
Figure 4:
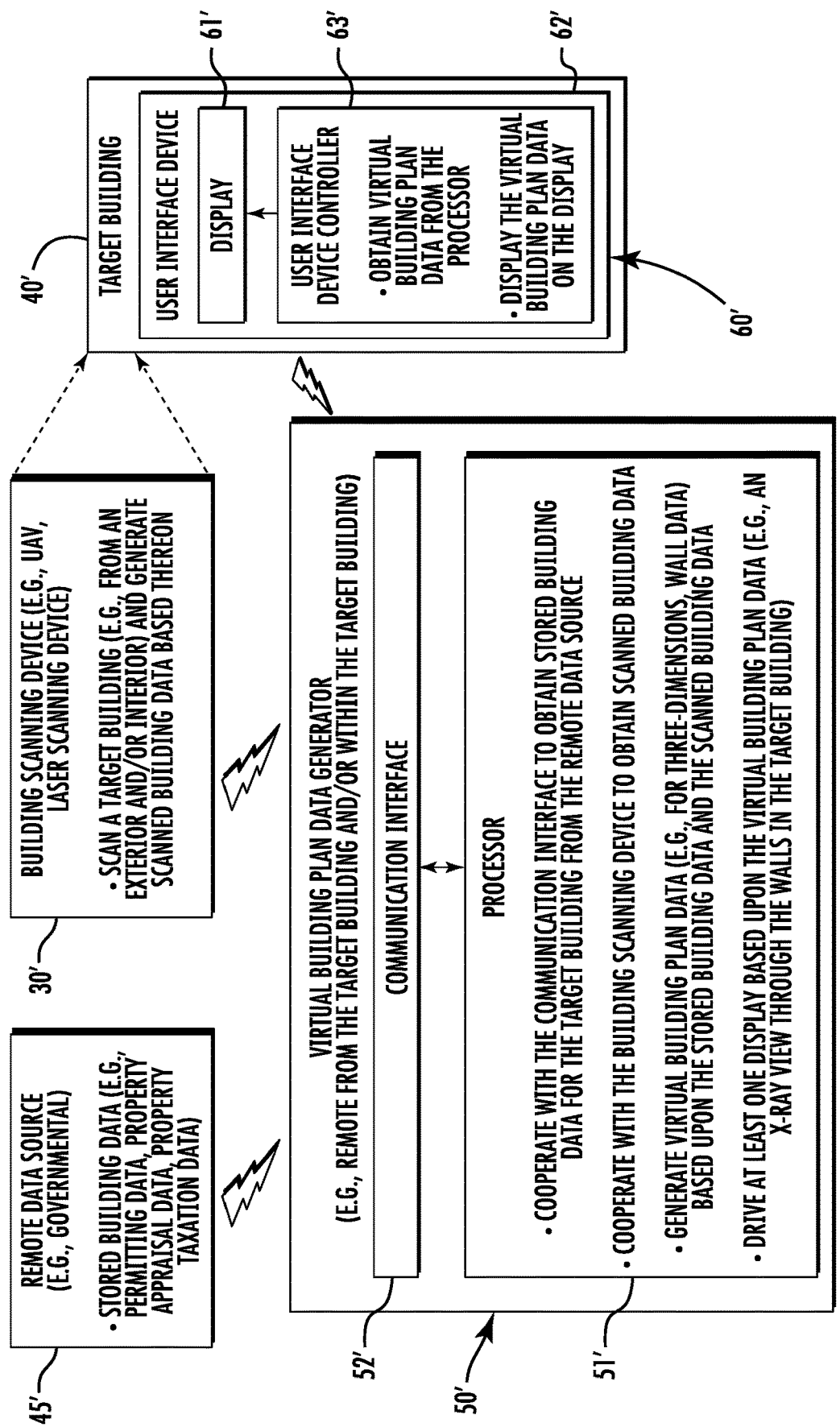
FIG. 4 is a schematic block diagram of the system of FIG. 3.

Referring now to FIGS. 3-4, in another embodiment, for example where the virtual building plan data generator 50' is remote from the target building (i.e., in the cloud), the system 20' may also include a user interface device 60' that includes a portable housing 62' that carries the display 61'. The user interface device 60' may be carried by a user 70', for example, within the interior of the target building 40'. The user interface device 60' also includes a user device controller 63' carried by the portable housing 62'. The user device controller 62' obtains the virtual building plan data from the processor 51' and displays the virtual building plan data on the display 61'. The virtual building plan data may be obtained wirelessly, for example, or by other communications technique as will be appreciated by those skilled in the art.

Figure 5:
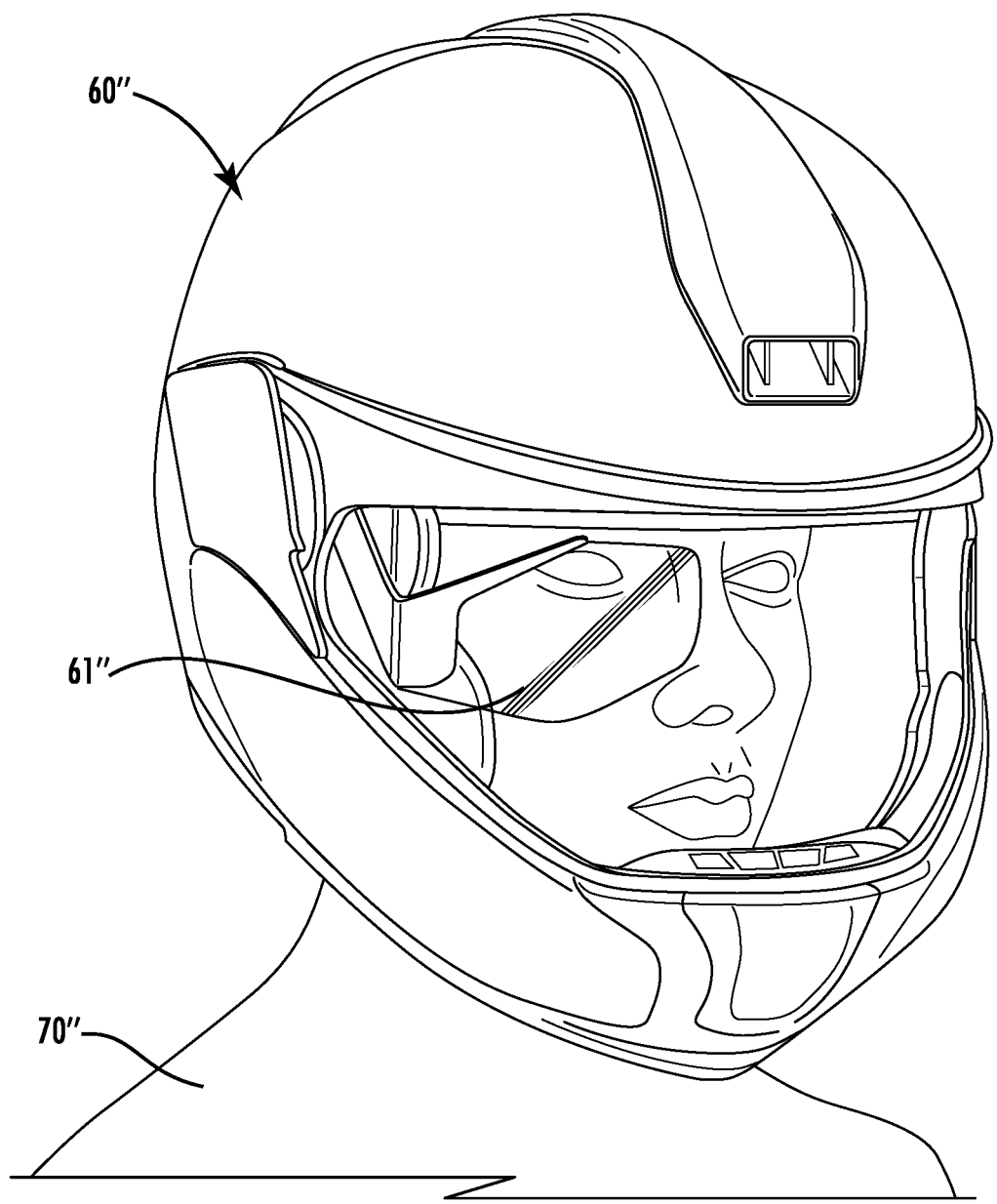
FIG. 5 is a perspective view of a user interface device in accordance with an embodiment.
Figure 6:
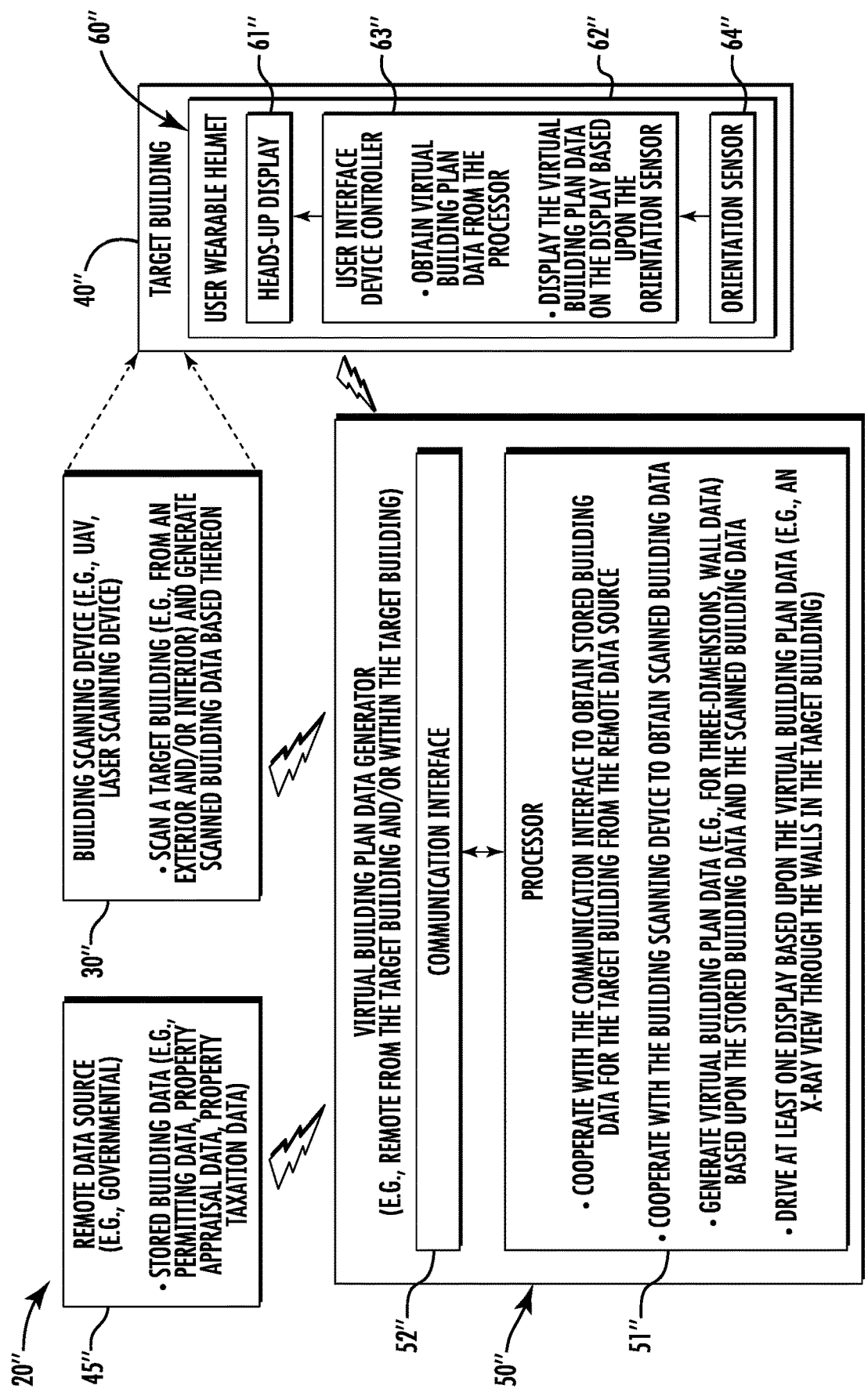
FIG. 6 is a schematic block diagram of the user interface device of FIG. 5.

Referring to FIGS. 5-6, in an embodiment, the user interface device 60" may be in the form of a user-wearable helmet that mounts the portable housing 62". In other words, the display 61" may be considered a heads-up display and may be responsive to movement of the user. To be responsive to movement from the user, the user interface device 60" may include an orientation sensor 64" (e.g., accelerometer, gyroscope, etc.) carried by the portable housing 62", and the user device controller 63" accordingly displays the virtual building plan data based upon the orentation sensor or sensed orientation. The display 61" may be updated based upon increments or ranges of sensed orientation, for example.

While embodiments have been described herein whereby the virtual building plan generator 50' is remote from a user interface device 60', it should be appreciated by those skilled in the art that there may not be a remote user interface device. In other words, the processor and communications interface of the virtual building plan generator 50, for example, as described with respect to FIGS. 1 and 2, may be carried by a portable housing that is carried by a user or helmet, for example, as illustrated in FIG. 5. In other words, the processing or functionality of the virtual building plan generator 50 may be performed at a helmet or other device and not communicated to a remote user interface device. Still further, while a helmet is described, it should be understood that the virtual building plan generator may 50 may be carried by a portable housing that defines a laptop computer, tablet, cellphone, etc. that may be carried by the user, for example, into the building.

Of course, while several different embodiments of the user interface device have been described, it should be understood that the user interface device may be in another form, for example, a tablet or cellphone that may be held by the user, within or outside the target building, or used at a command center. The system may include multiple user interface devices in communication, for example, with a command and control center for coordinating operations. The system may also include multiple types of user interface devices, for example, as described herein. It should be noted that elements illustrated but not specially described are similar to like elements in the embodiments in FIGS. 1-2 and need no further discussion.

Further details of the system 20 by way of example embodiments and exemplary operation of the system will now be described. In a given embodiment, the system may be used by special operations groups and/or emergency service providers (i.e., police/fire). In this example embodiment, the user wearable helmet (or goggles) provides head/sight protection, night vision, thermal imaging and blue force tracking (i.e., global positioning system (GPS) tracking). The helmet also includes the heads-up display, which is superimposed in the viewer's normal field of vision. Normal and night vision may be uncompromised by the superimposed display. The heads-up display presents a set of lines showing a 3D outline of the room or other interior space on the other side of the wall or surface in the direction the user is looking. For example, if the user looks at an actual wall in the actual or target building, the user and can see, with the lines depicted on the heads-up display, an outline, in 3D, of the room on the other side of the wall.

As the user's head rotates left and right and pivots up and down, the outline of the room behind the wall is aligned with the outline of the room in which the operator is located. Therefore, a form of x-ray vision of the 3D configuration of interior spaces around the user and even on the floors immediately above and below the user is provided.

When a team goes in, for example, each member knows how the interior space is configured behind the immediate walls and surfaces around him/her. The helmet (or goggles) include blue force tracking (i.e., GPS) so each team member knows where the other team members are located and their locations are depicted on the heads-up display in real time. An incident commander may be working off a laptop in a mobile command center, and the location of each team member is depicted on a display of the laptop. The incident commander's laptop and each team member's heads-up display may include a set of controls or inputs that allow the user or operator to toggle among various modes: (i) the floor plan in 3D of the particular floor upon which the operator is located with overlays of natural gas lines, electrical plans or other sheets from the building plans selected by an incident commander, (ii) the floor plan in 3D of any other floor the operator chooses to view, again with overlays of the same information, (iii) a 3D view of the overall building (and the grounds immediately adjacent to the building), and (iv) an information screen. Other modes and/or additional information may be toggled as will be appreciated by those skilled in the art.

In each mode, the heads-up display may use icons to show the locations of the user or operator and other team members using GPS. In addition, the last known locations of hostiles, hostages, victims, potentially dangerous devices, etc., are loaded in real time by the incident commander and team members as they move through the target building. Alternatively, the information may be called out by the team members (e.g., "potential device in NW corner"). The incident commander or assistant may then load that information so that it may be accessible across the system.

The incident commander may also access other types of property records, such as, for example, hazardous waste locations and quantities. Team members have the ability to place GPS trackers on casualties, recovered hostages, etc. The confidence level in the location of a particular hostile or hostage may be indicated by the intensity or color of the icon, for example. For example, if the incident commander is certain of the location of interest, the icon may be displayed with the same intensity as the icons for the team members whose locations are known. Accordingly, in the mode showing the entire building, the operators and the incident commander view the entire building, the surrounding grounds, locations (in real time) of all team members represented by icons as they move around within the building or on the grounds and/or all last known locations of hostiles, hostages, devices, etc.

Moreover, each display (e.g., the incident commander's and each helmet) may display other types of information (such as a passport photo of a suspect or potential victim), which may be inputted in real time as new information becomes known. This information may be loaded by team members as they move through the building and gather information or by local law enforcement, rescuers, and/or federal agencies that have arrived at the incident.

In another embodiment, the functions of the system, and more particularly, the functions of the processor, may be referred to as Emergency Responder Geographic Information Network Technology (ERGINT). Along the lines described above, ERGINT utilizes raw data from the following sources to create a virtual building plan in 3D: (i) a first responder records system that obtains selected documents from property permitting records within minutes, (ii) the building scanning device, further details of which will be described below, and/or (iii) a real time building plan generator for active incidents, also discussed below. Once the virtual building plan has been generated, ERGINT is employed and the virtual building is related spatially to the target building and both are related to GPS, as follows.

For example, a member of the special ops or SWAT team may shoot a reference point on the actual building exterior using 3D laser scanning and links this point to GPS. Next, the team member, using ERGINT, relates this point to the corresponding point on the virtual building plan. Similarly, the team member uses the laser on other points on the exterior of the target building and repeats the same exercise. It should be noted that the purpose is not to scan the entire exterior of the target building, but to quickly scan a sufficient number of points to spatially match the virtual building plan to the target building. Finally, ERGINT is used to generate the virtual grounds surrounding the virtual building plan.

In one exemplary embodiment, the display may offer nearly equal information and utility at a significantly lower cost per unit than similar displays. For example, when the display is carried by a helmet, the helmet has an internal compass and communicates the precise direction the helmet is pointing at any one time. Also, instead of the heads-up display being superimposed in the user's normal field of vision, the user views the image by looking slightly up at an angle just above the user's normal field of vision and the image is tilted approximately twenty to thirty degrees towards the user for orientation and perspective. The display is automatically driven with a 3D extruded image of the interior space on the other side of the wall at which the helmet is pointed. The image also includes all of the other information that relates to that portion of the floor plan on the heads-up display. However, this display provides standard images. For example, if the user is in a square room, the system will provide one of four images depending on which of the four walls at which the helmet is pointed. Therefore, as the user is pivoting the user's head along the length of a particular wall, the image of the interior space on the other side of the wall in the heads-up display will not change. When the user's helmet is pointed in the direction of one of the other three walls, the user sees the interior space on the other side of the respective wall. Note that when the user's helmet is pointing at a corner, an image may not be displayed until the user pivots the helmet (a degree or two to the left or right, as applicable) to clarify for the system the desired image. As described above, the user may select from a menu the various modes.

In a given example embodiment where the building scanning device is in the form of a 3D laser UAV (LSUAV), the LSUAV may be launched at or near the target building to relatively quickly create scanned building data or one or more 3D scaled computer models that include exterior façades of the target building. As will be appreciated by those skilled in the art, the LSUAV, as a UAV, includes a rotor, motor coupled to the rotor, and other components typically found in silent drone technologies.

In some circumstances, the use of a UAV may not be practical. In these circumstances, the target building may be scanned from the ground using an observed 3D laser scanner or unobserved at a remote distance, for example, from a vehicle equipped with a "telescoping," architecture-grade telephoto 3D laser scanning device, as will be discussed in further detail below. The computer models of the facades or scanned building data shows the relatively precise locations and dimensions of windows, doors and other features of the facades.

ERGINT unites the exterior facades and generates a 3D scale model of the exterior or shell of the virtual building plan. Next, the team member shoots a reference point on a particular façade of the target building, links it to GPS and relates this point to the corresponding point on the computer model of the virtual building plan created by ERGINT. The team member then shoots several other reference points on the same and other exterior façades of the target building and repeats the same exercise. This data is loaded into ERGINT. The virtual building plan data created by ERGINT is related spatially to the target building and both are related to GPS. If access to the target building is provided, a team member proceeds into the interior of the target building, and using photogrammetry, creates interior floor plans of each level of the building. The photogrammetry may be done after hours or, if a restaurant or similar building open to the public, discreetly, using equipment concealed in a prop, such as, for example, a baseball cap. Alternatively, at a somewhat higher cost, this step may be performed using the LSUAV or, at a remote distance unobserved by the hostiles, utilizing a van equipped with a "telescoping," architecture-grade telephoto 3D laser scanning device, as will be discussed in further detail below. Utilizing this further data, ERGINT generates a 3D scale model of the outside and inside of the building, inclusive of interior floor plans for each level of the building. The foregoing procedure is repeated for the other desired buildings.

In another exemplary embodiment, the system described herein may be particularly useful, for example, for active incidents involving office, retail, government, institutional, hospital and similar buildings (i.e., non-residential buildings) having banks of windows. As will be appreciated by those skilled in the art, over 60% of non-residential buildings have banks of windows. As an active incident, the team would likely not have access to the building interior to use photogrammetry for the step above of generating the interior floor plans. Instead, the team's mobile command center or a separate van would be equipped with a "telescoping," architecture-grade telephoto 3D laser scanning device. The telephoto feature would allow the 3D laser scanning to be performed at a stand-off or other remote distance that both increases the safety for the operator(s) and minimizes the risk of being observed by hostiles. A vehicle-mounted "telescoping" antenna mast (up to 100') ensures that the 3D laser scanning may be performed at the appropriate elevation for the particular floor being scanned. (Currently, mobile news teams raise and lower an antenna using commercially available vehicle mounted antenna masts.) The vehicle may be moved around the target building to complete the scanning.

Alternatively, if circumstances permit, a team member may guide (i) a UAV equipped with quiet drone technologies and architecture-grade 3D laser scanning ("LSUAV") to windows and openings and utilize 3D laser scanning of the portions of the interior that may be viewed by the LSUAV, and/or (ii) a robot equipped with laser scanning/photogrammetry for accessible portions of the building. A 3D scale model of the outside and inside of the building (i.e., a virtual building plan based upon the building plan data), inclusive of interior floor plans for each level of the building is thus generated. The virtual building plan is related spatially to the actual building and both are related to GPS. Although the banks of windows in these types of buildings provide great visibility, certain portions of interior space may not be visible. Under such circumstances, the system 20 will show no lines for portions of the interior that is not visible. In some embodiments where the use of a UAV or drone is not considered dangerous or provocative, team members may launch camera and infrared-equipped UAVs to collect data on the number of occupants, hostiles, hostages, victims, photos, weapons, potential devices, etc., to be loaded as icons for display.

In some embodiments, the users may archive additional information as desired. For example, U.S. embassy staffs in high-risk countries may archive "walk-through" video footage or digital photographs of their facilities to assist military forces in planning and executing a noncombatant evacuation operation, should one become necessary. Similarly, authorities may archive building information for civic centers, sports arenas or other public places that could be likely targets of terrorist attacks. While the vast majority of the structural plans that ERGINT or the system will provide are public documents, some of this archived information might be considered sensitive. In that event, ERGINT may incorporate automated security measures to control access. It is important to note that video footage should not be considered a substitute for a floor plan, since video is inherently disorienting without the overall context that a floor plan provides, as will be appreciated by those skilled in the art.

Other embodiments of the system or ERGINT may include basic image manipulation. For example, individual users may perform standard manipulations of the image, such as zooming, rotating or shifting from overhead to oblique view. Based on the user device, these functions could be performed by hand swipes on touch-screens or by menu selection, for example. A user may also toggle between displays, for example, a site plan that shows all the buildings, grounds and other structures in a compound and a building floor plan that shows the interior configuration of one key building in the compound.

A user may also share inking, highlighting and text. For example, a user may ink the floor plan (e.g. raw 2D and/or 3D virtual building plan) in freehand, and that ink will be visible to other users, allowing elements, for example, to indicate routes of movement or establish boundaries. The user may also choose ink color from a palette so as to visually distinguish different users. The user may also select basic features like ink thickness or solid versus dashed lines, and may delete ink by a typical select-and-cut shortcut. When a user does not want to leave permanent ink, for example, but simply wants to draw others' attention to a part of the floor plan or virtual building plan, a user may highlight or draw in bright, transparent strokes that will fade and disappear after a few seconds, for example. A user may also be able to add free text to the floor plan, allowing them, for example, to designate facades, doorways or quadrants in a building.

In some embodiments, GPS tracking may be used. For example, based upon the geospatial correlation described above, the location of friendly elements may be plotted on the virtual building plan in real time as these friendly elements move through the target building, allowing commanders to track the progress of their elements, providing for better coordination between those elements on the ground and lessening the chances of friendly-fire incidents.

Operators could also place simple GPS transmitters on hostages, casualties or prisoners they discover as they move through the building, facilitating tracking, evacuation, treatment and/or custody.

Shared annotations may also be a feature of the system in some embodiments. For example, a user may choose from a selection of standard icons that are indicative of annotations providing situation reports or other key information on the floor plan. These annotations may help create and maintain shared situational awareness. The annotations may be time-stamped, geospatially plotted, and attributed as to originator. These annotations may include text, imagery, audio, a situation report, a digital photo of a trap or blocked passage, and/or a voice report, for example. Other users may select, for example, by clicking on the icon, to see or hear the full report. Based on established protocols, annotations may be confirmed, updated, moved or deleted. A variety of visual techniques may be used to convey additional information—flashing or bold to indicate new or unopened annotations or fading color to indicate age, as will be appreciated by those skilled in the art. Alternatively, where it is burdensome for operators inside the structure to make annotations as they move, a voice report may instead by issued, which a designated officer in the command post captures in an annotation for all to see.

The system may be considered an open architecture system with respect to preferences. User interface and operations are designed as an open architecture that generally does not restrict user freedom of action. This may permit users to create their own system preferences as to display appearance, shortcuts, hand swipes, etc. It may also permit organizations to establish their own protocols or standing operating procedures as to who has authority, for example, to change views or create, modify or delete annotations.

In some embodiments, the system may perform capture and playback operations. For example actions such as, for example, GPS tracks, display manipulations, inking, annotations, etc., may be tracked or recorded so they can be played back later as part of an after-action review or subsequent training.

The following describes exemplary uses of the system 20 described herein. For example, in unstable overseas regions, before any actual crisis, authorities may use the system 20 to develop floor and site plans for structural terrain for which such documents do not already exist as public documents. Based on the priority sites identified by local personnel, trained survey teams would arrive to quickly map the critical structural terrain in a given city or region before moving on to the next location. This creates the structural terrain data that does not already exist. Similarly, responsible authorities at at-risk locations may archive video or other building information that would be useful to emergency responders in the event of a crisis—for example, a video tour of a building, which could help familiarize operators with the building if an evacuation becomes necessary.

The use of the system 20 or ERGINT begins when operators or planners identify the desire to operate on some specific piece of structural terrain. The use of the system 20 could happen at the organizational level, in the context of mission planning—for example: a deployed Marine Expeditionary Unit (MEU) tasked to evacuate a U.S. Embassy overseas during a deteriorating situation; a municipal SWAT team tasked to execute a search warrant of a suspected methamphetamine laboratory; or a U.S. Army Ranger platoon tasked to raid a compound to capture a high-value target suspected of hiding at the compound. Alternatively, the use of the system 20 could happen when an individual or small element responds to an emerging situation—for example: a patrol officer dispatched to respond to a report of someone waving a pistol and yelling loudly out a second-floor window of an apartment complex; or Army rifle squad tasked to clear a two-story residential compound as part of an ongoing house-to-house fight.

A responsible agent, a patrol officer, an incident commander, a team leader, and/or a unit commander may use the system 20 to query for any public building plans or other archived information about the property in question. The system or ERGINT relatively quickly provides the applicable building and site plans. Operators choose one or several plans to serve as the situation map for the operation.

At this point, the use of free text, ink, and highlighting, operators and planners collaborate from distributed locations to develop a common nomenclature for the terrain, designating facades, doors, windows, quadrants, etc. may begin. Similarly, control measures such as boundaries, coordinating points, rally points and objectives—making use of a palette of standard icons to represent them on the display may be established.

Meanwhile, if the accessed documents do not already contain geospatial data, the emergency responders survey the building to correlate the building plans to actual location to create reliable geospatial information. This is accomplished either by UAV or by a team member using a hand-held or ground-mounted laser scanner. Using annotations, planners populate the display with intelligence and other information. Because the system's open architecture typically does not constrain activities in any way, organizations establish their own procedures for inputting, confirming, modifying and deleting annotations. Inputs from networked sensors appear automatically, awaiting confirmation by a designated authority. Preexisting imagery or textual reports may be input manually.

Operators use these enhanced displays to create a common operating picture (COP) or user-defined operating pictures (UDOP), as appropriate. The decision whether to use a single COP or multiple UDOPs will generally depend on the situation, but the system 20 supports both. If it is particularly desirable to have users working off a single annotated floor plan, a COP is appropriate. With a single situation display, there may be little confusion but also no way to tailor the display to the different needs of individual users. In some situations, especially complex, larger-scale situations, a COP may not be desirable. Different individuals or elements may have differing visualization needs. For example, a battalion commander may need to view an entire compound and its environs, while a company commander may be interested in the floor plans of a single building, and a squad leader in that company is interested in a 3D model of only one corridor. In such situations, individuals should be able to create UDOPs that capture their specific needs. While each reflecting a tailored view, these UDOPs are based on a common data set. Users should be able to view others' UDOPs to collaborate (i.e., resolve differences, coordinate and de-conflict actions, and share information with a copy-and-paste).

Using the system 20 operators build a 3D model of the terrain, which retains any annotations or other augmented information that has been added to the 2D visualization. At corresponding assembly areas or even en-route, small teams that actually enter the terrain use the 3D model to conduct walk-through rehearsals to familiarize themselves with the terrain and work out any coordination issues, among themselves or with other teams. Depending on the scale of the map and the size of the operation, the locations of friendly units or individuals, with identifying labels, appear and move in real time.

Once the operation commences, and elements are moving through the terrain exploiting the common situational awareness on the shared displays of the system 20, operators coordinate and de-conflict actions relatively quickly and fluidly, lessening the dependency on centralized control. Elements communicate implicitly by placing information artifacts in the virtual environment for other elements as they move through, decreasing the need for explicit communication.

For example:
  a rescue worker, encountering impassable rubble in a corridor, quickly submits a situation report by creating an annotation in the form of an "obstacle" icon and attaches a digital photograph to it to tell others of a blocked passageway. The annotation with photo is automatically time-stamped, geo-located and attributed as to author;
  a soldier, discovering a group of evacuees hiding in a basement creates a "people" icon to annotate the fact and tags each person with a GPS wristband. Their location and movement now appear automatically on the display so their safe evacuation can be monitored;
  two Marine rifle squads clearing different wings of a building coordinate their movements using inking and highlighting on their tactical tablets: "You go down this hallway, and we will go down this hallway, and we will link up at the bathroom here;"
  a SWAT team leader assigns a new rally point for the separated elements of his team by dropping a "rally" icon at the designated location on the display;
  a police officer has pursued a fleeing armed suspect into a room in an abandoned warehouse. He reports this by making a voice report and a simple annotation on his tablet display, which appears as a flashing/beeping "suspect" icon on the building plan. Seeing this on his own tablet, the sergeant who has taken charge on the scene contacts the other responding officers, whose locations are also visible, and directs them using ink and highlighting to cover possible exits;
  an incident commander dealing with a major fire in a multi-story building tracks the locations and progress of his teams in a 3D virtual model of the building and builds an accurate visualization of the extent of the fire based on reports from those teams; and
  a FEMA official in Washington, D.C., in the wake of a major natural disaster, helps plan the federal response by using ERGINT to locate locations and facilities for temporary housing for both victims and responders, distribution centers for relief supplies, medical centers, relief headquarters, staging areas for vehicles and equipment, etc.

Some operators inside the buildings may wear or carry the display to enhance their understanding of the compartmentalized terrain and the situation immediately around them. Commanders at higher echelons may employ the system 20 using a variety of screen-based devices that provide more information and context.

In combat, as teams move through an unmapped building, a ground robotic weapons system may be employed that also scans as it advances under fire, for example. Similarly, squad members carry autonomous laser scanners attached to their combat harnesses. The scanning occurs strictly in the background and does not detract from performance of the primary mission. The system 20 correlates all the inputs to map the building or generate the virtual building plan data in real time as the squad advances. If and when the squads gets pinned down and takes casualties, reinforcements benefit from having a much better picture of the interior of the building.

The system 20 may capture every action in the virtual space, including inking, highlighting, annotations, friendly movements, etc. Operators play back the operation during the after-action review to identify lessons learned. Trainers may use the same digital record for subsequent training exercises.

While functions of the processor 51 and/or the user interface controller 63 have been described herein with respect to certain hardware devices, it should be understood that an application may be downloaded to a device, such as, for example, a cell-phone, for performing the operations described herein. The functionality may also be embodied as a non-transitory computer readable medium that includes computer executable instructions that when executed by the processor 51 or the user device controller cause the respective operations, as described herein, to be performed. Moreover, while several embodiments have been described herein, it should be appreciated that elements from the various embodiments may be used together.

Indeed, the embodiments of the system 20 described herein may be particularly useful with respect to structural terrain. As noted above, structural terrain is relatively complex. It is characterized by walls and roofs of various constructions, which make up its external faces. It includes multiple stories, including basements and attics. It includes passages such as corridors, stairs, elevators, underground tunnels, and sewers. It includes a multiplicity of kinds of rooms or compartments of countless sizes and configurations. It represents a wide variety of constructions from heavy stone, steel and concrete to light wooden frame. It includes internal support systems, such as heating and cooling ducts. It typically includes electrical systems and gas lines and, in specialized cases, concentrations of hazardous materials. In the case of infrastructure like bridges, dams or power stations, it includes sophisticated control systems, often housed in separate structures.

Because of those features, structural terrain is qualitatively different from natural terrain like hills, valleys and rivers. Structural terrain is typically defined by an interior configuration that most natural terrain lacks (with occasional exceptions, for example, caves and tunnels). Structural terrain has a verticality or layering in the form of multiple stories that natural terrain does not. It is intensely and repetitively compartmentalized over very short distances. Finally, it is much more easily alterable than is natural terrain, whether accidentally by force majeure or collateral damage or intentionally by tactical design.

Accordingly, structural terrain presents very different tactical challenges to operators—police, firefighters, emergency medical, search-and-rescue, military—than does natural terrain. The interior configuration of the structural terrain is generally opaque to operators from the outside, causing uncertainty and complications in planning and execution. Moreover, the increased compartmentalization continues to limit visibility, understanding and cooperation among elements once inside the structure, often hampering situational awareness and even causing disorientation, for example.

However, operation in structural terrain is growing in frequency and urgency. Through urbanization, the likelihood that emergency-response operations large and small will take place in structural terrain will likely increase. Moreover, as those urban areas become more densely populated, even localized emergencies may require increasingly larger responses.

Thus, there may be a desire for more reliable and detailed floor plans, which have been generally unavailable to operators in a timely manner. The system 20 advantageously uses remote stored data (e.g., digital documents) along with scanned building data to more quickly provide more reliable and detailed building plan data to operators in a relatively easy-to-use format. Moreover, the x-ray view provides a flexible command support system that may improve shared situational awareness, on-the-move coordination, and implicit communication in a way that could dramatically enhance mission success. The ability to rapidly deploy and utilize the system 20 may also decrease response times. Accordingly, the system 20 may substantially improve performance both in terms of success and response times for a wide variety of military and emergency-response personnel, including infantry and special operations forces, patrol officers, SWAT teams, firefighters, and emergency medical personnel, and search-and-rescuers.

A method aspect is directed to a method of generating virtual building plan data. The method includes using a processor 51 coupled to a communication interface 52 to cooperate with the communication interface to obtain stored building data for a target building 40 from a remote stored data source, and cooperate with a building scanning device 30 to obtain scanned building data. The building scanning device 30 is configured to scan the target building and generate the scanned building data based thereon. The processor 51 may also be used to generate the virtual building plan data based upon the stored building data and the scanned building data, and drive at least one display 61 based upon the virtual building plan data.

Still further, the system 20 may be used for training exercises by SWAT, special operations, etc. During such training exercises, for example, building plans pre-construction may be 3D modeled so that emergency management can do drills, pre-plan placement of cameras, and other emergency management infrastructure relating to devices, for example, to control intake of outside air, redundant communications systems, generators for back-up electrical, security for building access, protecting building systems, and/or door lock configurations (e.g. it may be particularly desirable for law enforcement to know lock configurations for individual doors for breaching a door).

Further details and features are described in U.S. Pat. Nos. 8,271,431, 9,275,357, and 8,606,747, and U.S. patent application Ser. No. 15/006,856 filed on Jan. 26, 2016, the entire contents of each of which are herein incorporated in their entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention is claimed as follows:
1. A method comprising:
using a processor coupled to a communication interface to
receive a request from a user for virtual building plan data of a target building, and
after receiving the request cooperate with the communication interface to obtain stored building data for the target building from a remote stored data source, cooperate with a building scanning system located outside of the target building to obtain scanned building data, the scanned building data being obtained after receiving the request for virtual building plan data and including a first plurality of points on an exterior of the target building without a second plurality of points of the entire exterior of the target building that are possible to scan, the first plurality of points being a subset of the second plurality of points that is sufficient to spatially relate an interior floor plan of a virtual building plan to the target building, generate the virtual building plan data based upon the stored building data and the scanned building data based upon the request from the user, spatially relate the target building to the virtual building plan data based on the first plurality of points on the exterior of the target building in the scanned building data scanned from outside the target building relating to corresponding points on the virtual building plan, wherein the first plurality of points on the target building are linked to a plurality of respective geospatial points of the exterior of the target building, interior points in the virtual building plan data are related to geospatial points of the interior of the target building, and the interior points of the target building are related to the interior floor plan of a virtual building, and drive at least one display associated with the user based upon the virtual building plan data to display the interior floor plan of the virtual building that is related spatially to the target building.

2. The method of claim 1, wherein the processor is used to generate the virtual building plan data for three dimensions.

3. The method of claim 1, wherein the virtual building plan data comprises wall data, and wherein the processor is used to drive the at least one display to display an x-ray view through walls in the target building.

4. The method of claim 1, wherein a portable housing to be carried by the user is configured to carry the processor and the communication interface.

5. The method of claim 1, wherein a user-wearable helmet is configured to carry the processor and the communication interface.

6. The method of claim 1, wherein a user interface device is configured to be carried by the user and comprises a portable housing configured to carry the at least one display and a user device controller carried by the portable housing and configured to obtain the virtual building plan data from the processor and display the virtual building plan data on the at least one display.

7. The method of claim 1, wherein a user interface device is configured to be carried by the user and comprises a user-wearable helmet configured to carry the at least one display and a user device controller carried by the user-wearable helmet and configured to obtain the virtual building plan data from the processor and display the virtual building plan data on the at least one display.

8. The method of claim 7, wherein the user interface device comprises an orientation sensor carried by the user-wearable helmet, and wherein the user device controller is configured to display the virtual building plan data based upon the orientation sensor.

9. The method of claim 1, wherein the stored building data comprises at least one of permitting data, property appraisal data, and property taxation data.

10. The method of claim 1, wherein the processor is used to cooperate with the communication interface to obtain the stored building data for the target building from the remote stored data source, which comprises at least one governmental data source.

11. The method of claim 1, wherein the processor is configured to generate the virtual building plan data for three-dimensions, and wherein the method comprises using a user device controller to display the virtual building plan data in three dimensions.

12. The method of claim 1, wherein the building scanning system is a ground mounted device located outside the target building.

13. The method of claim 1, wherein the building scanning system includes a telescoping scanning device.

14. The method of claim 1, wherein the building scanning system includes a telephoto scanning device.

15. The method of claim 1, wherein the building scanning system is remotely located at a distance above scanned points on the building.

16. The method of claim 1, wherein the scanned building data is related to a geospatial position.

17. The method of claim 1, wherein a user device that is configured to be at least one of worn and carried by the user is related spatially to both of the virtual building and the target building.

18. The method of claim 17, wherein the virtual building, the target building, and the user device are all geospatially related.

19. The method of claim 1, wherein the geospatial points are GPS coordinates.

20. A system comprising:
a communication interface; and
a processor coupled to the communication interface and configured to:
receive a request from a user for virtual building plan data of a target building, and
after receiving the request
cooperate with the communication interface to obtain stored building data for the target building from a remote stored data source,
cooperate with a building scanning system located outside of the target building to obtain scanned building data, the scanned building data being obtained after receiving the request for virtual building plan data and including a first plurality of points on an exterior of the target building without a second plurality of points of the entire exterior of the target building that are possible to scan, the first plurality of points being a subset of the second plurality of points that is sufficient to spatially relate an interior floor plan of a virtual building plan to the target building,
generate the virtual building plan data based upon the stored building data and the scanned building data based upon the request from the user,
spatially relate the target building to the virtual building plan data based on the first plurality of points on the exterior of the target building in the scanned building data scanned from outside the target building relating to corresponding points on the virtual building plan, wherein the first plurality of points on the target building are linked to a plurality of respective geospatial points of the exterior of the target building, interior points in the virtual building plan data are related to geospatial points of the interior of the target building, and the interior points of the target building are related to the interior floor plan of a virtual building, and drive at least one display associated with the user based upon the virtual building plan data to display the interior floor plan of the virtual building that is related spatially to the target building.

21. The system of claim 20, further comprising:
a portable housing to be carried by the user, wherein the portable housing carries the processor and the communication interface.

22. The system of claim 20, further comprising:
a user-wearable helmet that carries the processor and the communication interface.

23. The system of claim 20, further comprising:
a laser scanning device.

24. The system of claim 23, wherein the laser scanning device is mounted to an unmanned and aerially operated device.

25. The system of claim 20, further comprising:
a robot equipped with at least one of a laser scanning device and a photogrammetry device.

26. The system of claim 20, further comprising:
a plurality of different scanning devices.

27. A non-transitory computer readable medium that includes computer executable instructions that, when executed by a processor coupled to a communication interface, cause the processor to:
receive a request from a user for virtual building plan data of a target building, and
after receiving the request cooperate with the communication interface to obtain stored building data for the target building from a remote stored data source, cooperate with a building scanning system located outside of the target building to obtain scanned building data, the scanned building data being obtained after receiving the request for virtual building plan data and including a first plurality of points on an exterior of the target building without a second plurality of points of the entire exterior of the target building that are possible to scan, the first plurality of points being a subset of the second plurality of points that is sufficient to spatially relate an interior floor plan of a virtual building plan to the target building, generate the virtual building plan data based upon the stored building data and the scanned building data based upon the request from the user, spatially relate the target building to the virtual building plan data based on the first plurality of points on the exterior of the target building in the scanned building data scanned from outside the target building relating to corresponding points on the virtual building plan, wherein the first plurality of points on the target building are linked to a plurality of respective geospatial points of the exterior of the target building, interior points in the virtual building plan data are related to geospatial points of the interior of the target building, and the interior points of the target building are related to the interior floor plan of a virtual building, and drive at least one display associated with the user based upon the virtual building plan data to display the interior floor plan of the virtual building that is related spatially to the target building.

* * * * *